United States Patent
Lee

(10) Patent No.: US 6,805,163 B2
(45) Date of Patent: Oct. 19, 2004

(54) MICRO LOCK VALVE

(75) Inventor: Yong-kwun Lee, Seongnam (KR)

(73) Assignee: Samsung Electronics Co., Ltd., Suwon (KR)

(*) Notice: Subject to any disclaimer, the term of this patent is extended or adjusted under 35 U.S.C. 154(b) by 33 days.

(21) Appl. No.: 10/214,552

(22) Filed: Mar. 9, 2002

(65) Prior Publication Data

US 2003/0164194 A1 Sep. 4, 2003

(30) Foreign Application Priority Data

Mar. 4, 2002 (KR) .......................... 2002-11317

(51) Int. Cl.[7] ............................................. F15B 13/044
(52) U.S. Cl. ............................. 137/625.65; 137/625.27
(58) Field of Search ........................ 137/625.27, 625.65

(56) References Cited

U.S. PATENT DOCUMENTS

| 4,190,081 A | * | 2/1980 | Coles .................. 137/625.65 |
| 4,574,686 A | * | 3/1986 | Budzich ............... 137/625.65 |
| 4,949,413 A | * | 8/1990 | Goodwin ............... 251/129.11 |

FOREIGN PATENT DOCUMENTS

KR   20-228178   6/1999

* cited by examiner

Primary Examiner—Gerald A. Michalsky
(74) Attorney, Agent, or Firm—Staas & Halsey LLP

(57) ABSTRACT

A micro lock valve includes a cylinder forming an air chamber. One part of the cylinder is provided with an inlet port and an outlet port which communicate with each other through the air chamber, and the other part is provided with an exhaust port communicating with the air chamber. The micro lock valve also includes a plunger slidingly traveling in the cylinder, blocking up one of the inlet port or the exhaust port, and formed with a female screw thread in a traveling direction of the plunger. The micro lock valve includes a driving shaft having a male screw thread mating with the female screw thread and a driving motor rotating the driving shaft forwardly and backwardly. Accordingly, the micro lock valve maintains a normally closed state and a normally open state without consuming a large amount of electric power and is driven by low electric power for a long period of time. Further, the micro lock valve needs relatively low electric power to drive a number of the micro lock valves, and decreases noise due to an operation thereof.

4 Claims, 4 Drawing Sheets

MICRO LOCK VALVE

CROSS-REFERENCE TO RELATED APPLICATIONS

This application claims the benefit of Korean Application No. 2002-11317, filed Mar. 4, 2002, in the Korean Intellectual Property Office, the disclosure of which is incorporated herein by reference.

BACKGROUND OF THE INVENTION

1. Field of the Invention

The present invention relates in general to a valve, and more particularly, to a micro lock valve which maintains a normally closed state or a normally open state without consuming a large amount of electric power and is driven by low electric power for a long period of time.

2. Description of the Related Art

Generally, a pneumatic system is used in an automation system of an industrial field, a door of a bus or a subway, an air brake system of various vehicles, an air curtain of a department store or a refrigerator, pneumatic tools of an auto repair shop, etc. In the pneumatic system, air is compressed by a compressor and supplied to an actuator. The pressure due to the compressed air is converted into mechanical work.

The pneumatic system includes a pneumatic generator, an air cleaner, a pipe, a control valve, a driving device, and fittings. A directional control valve as the control valve is employed to change a flowing direction of air supplied to the actuator so as to control the actuator, and an electric valve is generally provided as the directional control valve. Herein, the electric valve is a general name given to a valve which is incorporated with an electromagnet and operated depending upon the electromagnet, and is also generally called a solenoid valve.

If the pneumatic system is applied to a small-sized machine, a miniature actuator and a controller to control the miniature actuator are combined, and the controller is driven by low electric power for a long period of time. However, the conventional solenoid valve consumes much of the electric power (e.g., about 0.5 W of electric power), in spite of the small-sized machine. Further, the pneumatic system generally needs a plurality of valves and thus, the electric power is consumed in proportion to the number of solenoid valves which should be simultaneously controlled.

Moreover, the electric power is continuously consumed even when the solenoid valve is in a normally closed state or a normally open state. Therefore, power consumption of the solenoid valve may be too much to form a small-sized pneumatic system.

Further, because the solenoid valve cannot maintain the normally closed state or the normally open state without consuming a large amount of electric power, when the supply of the electric power is cut off, the solenoid valve is loosened and a plunger in a cylinder of the pneumatic system is rapidly moved, thereby making a noise.

SUMMARY OF THE INVENTION

Accordingly, it is an object of the present invention to provide a micro lock valve which maintains a normally closed state and a normally open state without consuming a large amount of electric power and is driven by low electric power for a long period of time.

Additional objects and advantages of the invention will be set forth in part in the description which follows and, in part, will be obvious from the description, or may be learned by practice of the invention.

The foregoing and other objects of the present invention are achieved by providing a micro lock valve including a cylinder forming an air chamber. One part of the cylinder is provided with an inlet port and an outlet port which communicate with each other through the air chamber, and the other part is provided with an exhaust port communicating with the air chamber. The micro lock valve also includes a plunger slidingly traveling in the cylinder, blocking up one of the inlet port or the exhaust port, and formed with a female screw thread in a traveling direction of the plunger. Further, the micro lock valve includes a driving shaft having a male screw thread mating with the female screw thread and a driving motor rotating the driving shaft forwardly and backwardly.

According to an aspect of the invention, the plunger is formed with a communicating hole through which the outlet port and the air chamber communicate with each other while the inlet port is blocked up by the plunger.

According to an aspect of the invention, the inlet port and the outlet port are provided in one side of the cylinder in parallel with a longitudinal direction of the cylinder, and the exhaust port is radially bored through the other side of the cylinder.

According to another aspect of the invention, the plunger and the cylinder have a noncircular cross section.

According to another aspect of the invention, the plunger and the cylinder have a circular cross section, and combined by a key to be prevented from rotating.

According to yet another aspect of the invention, the micro lock valve further includes a partition wall provided between the air chamber and the exhaust port, having an air passage being passed by the driving shaft, and an O-ring combined to the plunger and sealing the air passage.

BRIEF DESCRIPTION OF THE DRAWINGS

The above and other objects and advantages of the invention will become apparent and more appreciated from the following description of the preferred embodiment, taken in conjunction with the accompanying drawings of which.

DETAILED DESCRIPTION OF THE PREFERRED EMBODIMENT

Figure 1:
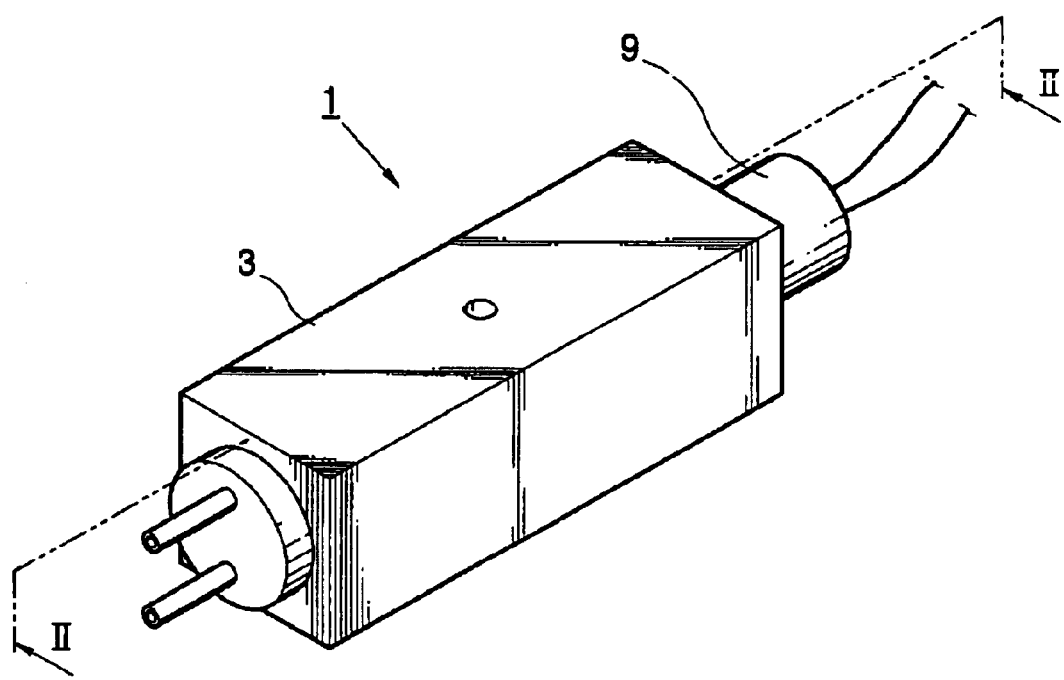
FIG. 1 is a perspective view of a micro lock valve, according to an embodiment of the present invention.

Reference will now be made in detail to the present preferred embodiment of the present invention, examples of which are illustrated in the accompanying drawings, wherein like reference numerals refer to like elements throughout.

Figure 2:
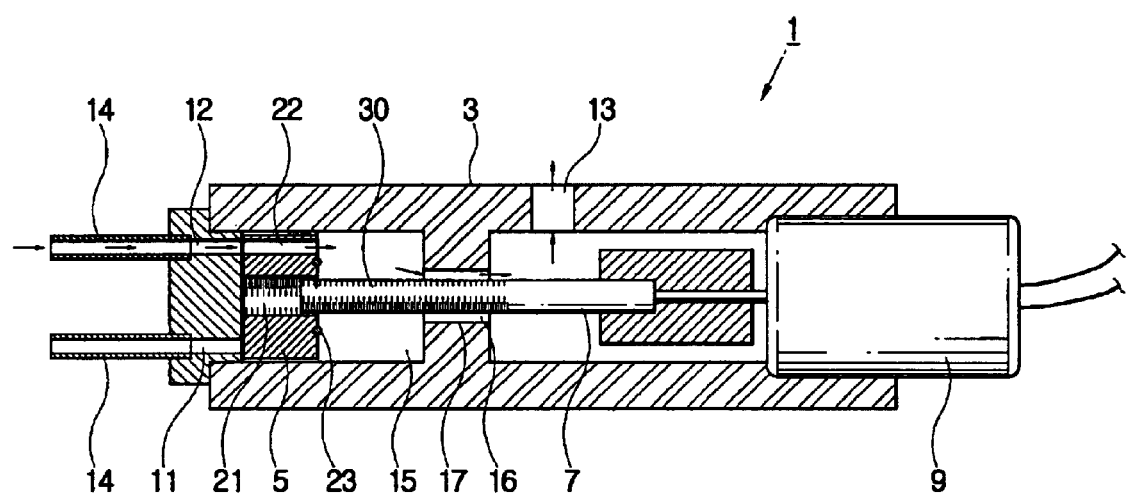
FIG. 2 is a sectional view illustrating a normally closed state of the micro lock valve in FIG. 1, taken along line II—II.

FIG. 1 is a perspective view of a micro lock valve, and FIG. 2 is a sectional view illustrating the micro lock valve in FIG. 1. As shown therein, a micro lock valve 1 includes a cylinder 3 forming an air chamber 15 therein and provided with an inlet port 11, an outlet port 12 and an exhaust port 13. The micro lock valve 1 also includes a plunger 5 slidingly traveling in the cylinder 3, a driving shaft 7 combined with the plunger 5, and a driving motor 9 rotating the driving shaft 7 forwardly and backwardly.

The cylinder 3 forms the air chamber 15 to accommodate compressed air temporarily therein, and is provided with a partition wall 17 partitioning an inside of the cylinder 3 and having an air passage 16. The air chamber 15 has a noncircular cross section along the traveling direction of the plunger 5, and is designed to shorten a traveling distance of the plunger 5 in order to increase a response speed of the micro lock valve 1.

One part of the cylinder 3 is provided with the inlet port 11 and the outlet port 12 which communicate with each other. The other part of the cylinder 3 is provided with the exhaust port 13.

The inlet port 11 is made of a pipe member and is employed as an inlet for the compressed air. The inlet port 11 also has one end connected to a pneumatic line (not shown) and the other end connected to the air chamber 15 of the cylinder 3, thereby allowing the pneumatic line and the air chamber 15 to communicate with each other.

The outlet port 12 is made of a pipe member like the inlet port 11 and is employed as an outlet for the compressed air. The outlet port 12 selectively communicates with one of the inlet port 11 and the exhaust port 13 according to a position of the plunger 5. The outlet port 12 is parallel to the inlet port 11, and has one end connected to the other pneumatic line (not shown) and the other end connected to the air chamber 15 of the cylinder 3, thereby allowing the other pneumatic line and the air chamber 15 to communicate with each other.

Between the inlet port 11 or outlet port 12 and the respective pneumatic line is provided a fitting member 14 to allow the inlet port 11 or outlet port 12 and the respective pneumatic line to communicate with each other.

One end of the fitting member 14 has an inside diameter smaller than respective outside diameters of the inlet port 11 and outlet port 12 to be forcibly fitted to the inlet port 11 and outlet port 12. The other end of the fitting member 14 has an inside diameter smaller than an outside diameter of a tube of each pneumatic line to be forcibly fitted to the tube of each pneumatic line without having leakage of the compressed air.

The exhaust port 13 is bored through the upper surface of the cylinder 3 to communicate with the air chamber 15 and is employed as an outlet for the compressed air. The exhaust port 13 selectively communicates with the outlet port 12 according to the position of the plunger 5.

The plunger 5 is combined to the driving shaft 7 and accommodated in the cylinder 3. The plunger 5 selectively blocks up one of the inlet port 11 and exhaust port 13 by slidingly traveling along the driving shaft 7. The plunger 5 also has a noncircular cross section along the traveling direction thereof, so that the plunger 5 is prevented from rotation. On a surface of the plunger 5 facing the partition wall 17 is provided an O-ring 23, thereby sealing the air passage 16 while the plunger 5 is in contact with the partition wall 17. The O-ring 23 may be provided on the surface of the partition wall 17 facing the plunger 5.

At a center of the plunger 5 is provided a combining hole bored through the plunger 5 to insert the driving shaft 7 therein. Further, the plunger 5 is provided with a communicating hole 22 located along the axial line of the outlet port 12, so that the outlet port 12 and the exhaust port 13 communicate with each other through the communicating hole 22 even if the inlet port 11 is blocked up by the plunger 5. Thus, when the plunger 5 is in contact with the inlet port 11 and outlet port 12, the plunger 5 blocks up only the inlet port 11, so that the communicating hole 22 allows the outlet port 12 to communicate with the air chamber 15, thereby allowing the compressed air to flow from the outlet port 12 to the exhaust port 13 via the air chamber 15.

Inside the combining hole of the plunger 5 is formed a female screw thread 21 to mate with a male screw thread 30 of the driving shaft 7. The driving shaft 7 has a rod shape, and is disposed along a lengthwise direction of the cylinder 3 inside the cylinder 3. The driving shaft 7 has one end combined to the plunger 5 and the other end combined to the driving motor 9. The driving shaft 7 is formed with the male screw thread 30 on the outer surface thereof, and mates with the female screw thread 21 formed inside the combining hole of the plunger 5. In this way, the plunger 5 rectilinearly travels in the cylinder 3 when the driving motor 9 rotates the driving shaft 7.

The driving motor 9 is a geared motor rotating the driving shaft 7 forwardly and backwardly. The driving motor 9 may be a DC (direct current) motor, an ultrasonic motor, etc. The driving motor 9 is controlled by a control signal of a control part (not shown) to be operated while the plunger 5 travels from a normally closed state to a normally open state or from the normally open state to the normally closed state. Thus, when the micro lock valve 1 reaches the normally closed state or the normally open state, the driving motor 9 is controlled to stop operating, so that there is no need of a sensor such as a limit switch. The control part controls a time during which the plunger 5 travels based on a number of rotations of the driving motor 9 and the traveling distance of the plunger 5.

In light of the above configuration, an operation of the micro lock valve 1 will be described hereinbelow, referring to FIGS. 2 and 3. Herein, for example, the normally closed state of the micro lock valve 1 is an initial state in which the micro lock valve 1 starts operating.

As shown in FIG. 2, when the micro lock valve 1 is in the normally closed state, the plunger 5 is in contact with the inlet port 11 and outlet port 12 connected to the respective pneumatic lines through the fitting member 14 in the cylinder 3. Here, the inlet port 11 is blocked up by the plunger 5, and the outlet port 12 communicates with the air chamber 15 of the cylinder 3 through the communicating hole 22, which is designed to continue the outlet port 12. Thus, the compressed air flows in the outlet port 12, the communicating hole 22, and the air chamber 15 in sequence. Because the air chamber 15 and the exhaust port 13 communicate with each other, the compressed air flows from the air chamber 15 to the exhaust port 13 through the air passage 16 formed in the partition wall 17, thereby discharging the compressed air. That is, in the normally closed state, the inlet port 11 is blocked up by the plunger 5, and the outlet port 12 communicates with the exhaust port 13 through the communicating hole 22, so that the compressed air flows from the outlet port 12 to the exhaust port 13.

Figure 3:
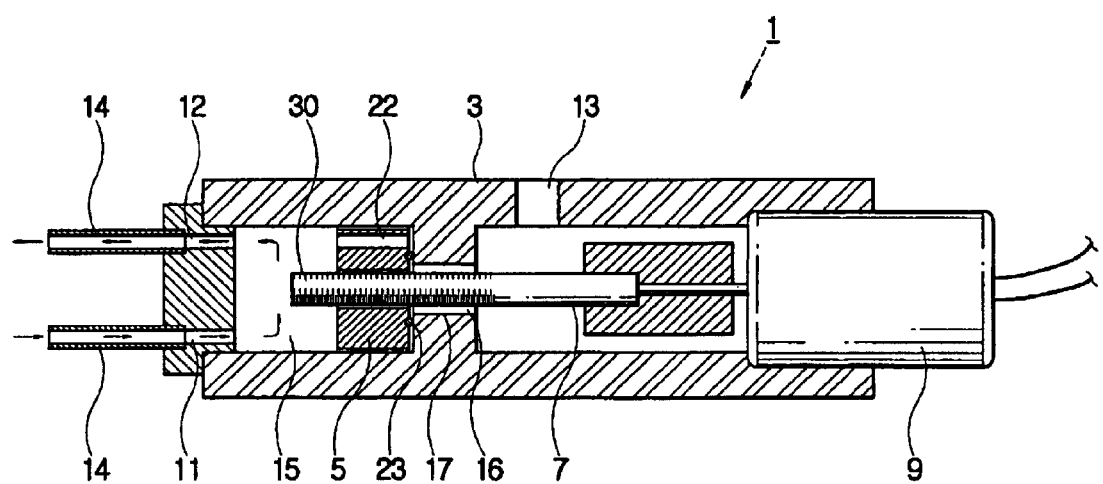
FIG. 3 is a sectional view illustrating a normally open state of the micro lock valve in FIG. 1, taken along line II—II.

As shown in FIG. 3, when the micro lock valve 1 is in the normally open state, the plunger 5 formed with the communicating hole 22 is in contact with the partition wall 17 in the cylinder 3. Here, the inlet port 11 communicates with the outlet port 12 through the air chamber 15, and the O-ring 23 provided in the plunger 5 blocks the air passage 16 formed in the partition wall 17. In this way, the exhaust port 13 does not communicate with the inlet port 11 and outlet port 12. Thus, the compressed air flows in one of the respective pneumatic lines, the inlet port 11, the air chamber 15, the outlet port 12, and the other one of the respective pneumatic lines in sequence. That is, in the normally opened state, the exhaust port 13 does not communicate with the inlet port 11 and outlet port 12 when the air passage 16 is blocked. The inlet port 11 communicates with the outlet port 12 through the air chamber 15, so that the compressed air of the pneumatic line flows from the inlet port 11 to the outlet port 12.

Figure 4:
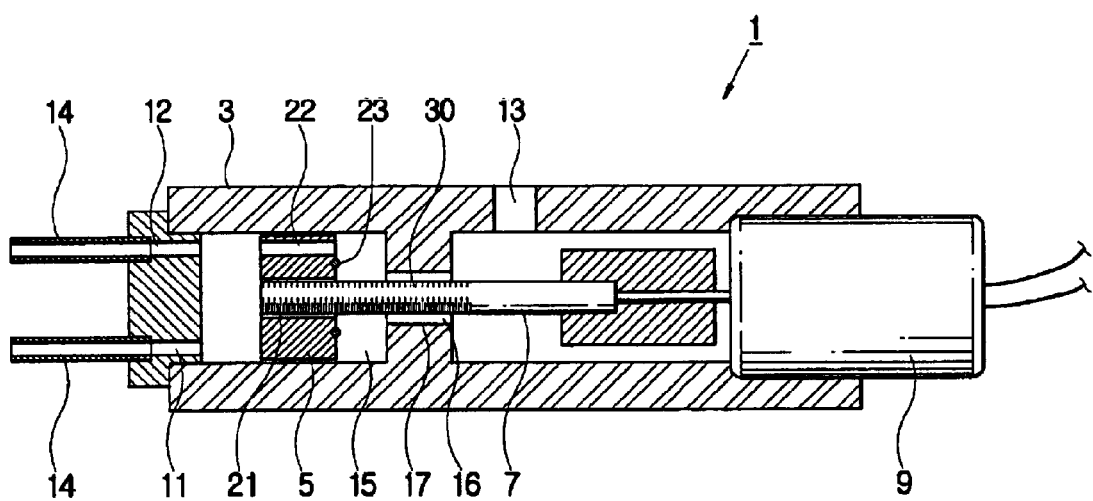
FIG. 4 is a sectional view illustrating the micro lock valve in FIG. 1 lying midway between the normally closed state and the normally open state, taken along line II—II.

Linear traveling of the plunger 5 from the normally closed state to the normally open state will be described hereinbelow, referring to FIG. 4.

When the driving motor 9 rotates the driving shaft 7 forwardly in the normally closed state, the female screw thread 21 of the plunger 5 mates with the male screw thread 30 of the driving shaft 7. In this way, the plunger 5 travels toward the partition wall 17 linearly along the driving shaft 7 until the O-ring 23 of the plunger 5 is in contact with the partition wall 17, thereby reaching the normally open state (see FIG. 3).

Oppositely, when the driving motor 9 rotates the driving shaft 7 backwardly in the normally open state, the female screw thread 21 of the plunger 5 mates with the male screw thread 30 of the driving shaft 7. Thus, the plunger 5 travels toward the inlet port 11 and outlet port 12 linearly along the driving shaft 7 until the plunger 5 is in contact with the inlet port 11 and outlet port 12, thereby reaching the normally closed state (see FIG. 2).

Accordingly, when the micro lock valve 1 lies between the normally closed state and the normally open state, air leakage may occur in the exhaust port 13 as the plunger 5 travels. However, the flowing direction of the air does not change rapidly.

Further, a noise made when the conventional solenoid valve is rapidly transformed from the normally closed state to the normally open state or from the normally open state to the normally closed state is decreased by the micro lock valve 1 according to the present invention.

As described above, contrary to the conventional solenoid valve which cannot maintain the normally closed state and the normally open state without consuming electric power and which is noisy, the micro lock valve 1 according to the present invention does not consume a large amount of electric power to maintain the normally closed state and the normally open state and is driven by low electric power for a long period of time.

In the conventional solenoid valve, the electric power is consumed in proportion to a number of the solenoid valves such that most of the electric power is relatively consumed in driving the solenoid valves. However, in the micro lock valve 1 of the present invention, a number of micro lock valves consume only an amount of electric power consumed in driving one micro lock valve. Therefore, a relatively small amount of electric power is consumed in driving the number of micro lock valves.

In the above embodiment, the plunger 5 and the cylinder 3 have a noncircular cross section. However, the plunger and the cylinder may have a circular cross section combined by a key to be prevented from rotating. In this case, the plunger is formed with a guide part grooved on a surface thereof, and the cylinder is formed with a guide key on an inside wall thereof engaged with the guide part of the plunger. Thus, the plunger is prevented from rotating in the cylinder while slidingly traveling.

Also, in the above embodiment, the plunger 5 rectilinearly travels along the driving shaft 7 by a screw thread. However, the plunger may rectilinearly travel by a slider crank mechanism using a motor. In this case, the micro lock valve is of a high-speed type.

In the above embodiment, the plunger 5 is provided with the communicating hole 22. However, between the plunger and the inside wall of the cylinder, there may be provided a space instead of the communicating hole, so that the outlet port and the air chamber communicate with each other through the space while the plunger blocks up the inlet port.

To make the size of the micro lock valve 1 small, the micro lock valve 1 may be manufactured by MEMS (micro electro mechanical systems).

Accordingly, as described above, the present invention provides a micro lock valve which maintains a normally closed state and a normally open state without consuming a large amount of electric power and is driven by low electric power for a long period of time. Further, the present invention provides a micro lock valve which needs relatively low electric power to drive a number of micro lock valves, and decreases noise due to an operation thereof. Therefore, because the micro lock valve according to the present invention is driven by relatively low electric power, it is possible to make the micro lock valve a small size and lightweight, so that not only the micro lock valve is applied to various small-sized pneumatic actuators, but also cost of production is decreased.

Although a preferred embodiment of the present invention has been shown and described, it would be appreciated by those skilled in the art that changes may be made in the embodiment without departing from the principles and spirit of the invention, the scope of which is defined in the claims and their equivalents.

What is claimed is:

1. A micro lock valve comprising:
   a cylinder forming an air chamber, one part of the cylinder being provided with an inlet port and an outlet port which communicate with each other through the air chamber and the other part being provided with an exhaust port communicating with the air chamber;
   a plunger slidingly traveling in the cylinder, selectively blocking up one of the inlet port and the exhaust port, and formed with a female screw thread in a traveling direction of the plunger;
   a driving shaft having a male screw thread mating with the female screw thread; and
   a driving motor to rotate the driving shaft forwardly and backwardly, wherein,
      the plunger is formed with a communicating hole through which the outlet port and the air chamber communicate with each other while the inlet port is blocked up by the plunger, and
      the inlet port and the outlet port are provided in one side of the cylinder in parallel with a longitudinal direction of the cylinder, and the exhaust port is radially bored through the other side of the cylinder.

2. A micro lock valve comprising:
   a cylinder forming an air chamber, one part of the cylinder being provided with an inlet port and an outlet port which communicate with each other through the air chamber and the other part being provided with an exhaust port communicating with the air chamber;
   a plunger slidingly traveling in the cylinder, selectively blocking up one of the inlet port and the exhaust port, and formed with a female screw thread in a traveling direction of the plunger;

a driving shaft having a male screw thread mating with the female screw thread;

a driving motor to rotate the driving shaft forwardly and backwardly;

a partition wall provided between the air chamber and the exhaust port, having an air passage being passed by the driving shaft; and an O-ring combined to the plunger and sealing the air passage, wherein, the plunger is formed with a communicating hole through which the outlet port and the air chamber communicate with each other while the inlet port is blocked up by the plunger.

3. A micro lock valve comprising:

a cylinder forming an air chamber, one part of the cylinder being provided with an inlet port and an outlet port which communicate with each other through the air chamber and the other part being provided with an exhaust port communicating with the air chamber;

a plunger slidingly traveling in the cylinder, selectively blocking up one of the inlet port and the exhaust port, and formed with a female screw thread in a traveling direction of the plunger;

a driving shaft having a male screw thread mating with the female screw thread;

a driving motor to rotate the driving shaft forwardly and backwardly;

a partition wall provided between the air chamber and the exhaust port, having an air passage being passed by the driving shaft; and an O-ring combined to the plunger and sealing the air passage, wherein, the plunger is formed with a communicating hole through which the outlet port and the air chamber communicate with each other while the inlet port is blocked up by the plunger, and the plunger and the cylinder have a noncircular cross section.

4. A micro lock valve comprising:

a cylinder forming an air chamber to accommodate compressed air therein and provided with an inlet port, an outlet port, and an exhaust port;

a plunger slidingly traveling in the cylinder;

a driving shaft combined with the plunger;

a driving motor to rotate the driving shaft forwardly and backwardly;

a partition wall provided between the air chamber and the exhaust port, having an air passage being passed by the driving shaft; and an O-ring combined to the plunger and sealing the air passage, wherein, the plunger is provided with a communicating hole allowing the outlet port and the air chamber to communicate with each other while the inlet port is blocked up by the plunger, the plunger travels between a normally closed state and a normally opened state of the micro lock valve, and wherein in the normally closed state, the inlet port is blocked up by the plunger and the outlet port communicates with the exhaust port through the communicating hole to allow the compressed air to flow from the outlet port to the exhaust port, and wherein in the normally opened state, the inlet port communicates with the outlet port through the air chamber to allow the compressed air to flow from the inlet port to the outlet port.

* * * * *

UNITED STATES PATENT AND TRADEMARK OFFICE
CERTIFICATE OF CORRECTION

PATENT NO. : 6,805,163 B2
DATED : October 19, 2004
INVENTOR(S) : Yong-kwun Lee

It is certified that error appears in the above-identified patent and that said Letters Patent is hereby corrected as shown below:

Column 1,
Line 8, "Mar 4, 2002" should be -- August 9, 2002 --.

Column 8,
Line 24, please change the word "dosed" to -- closed --.

Signed and Sealed this

Twenty-second Day of February, 2005

JON W. DUDAS
*Director of the United States Patent and Trademark Office*